Dec. 30, 1969     J. H. DE FREES     3,486,528
VENT VALVE HAVING DYNAMIC VALVE OPENING STRUCTURE
Filed Feb. 6, 1967     2 Sheets-Sheet 2

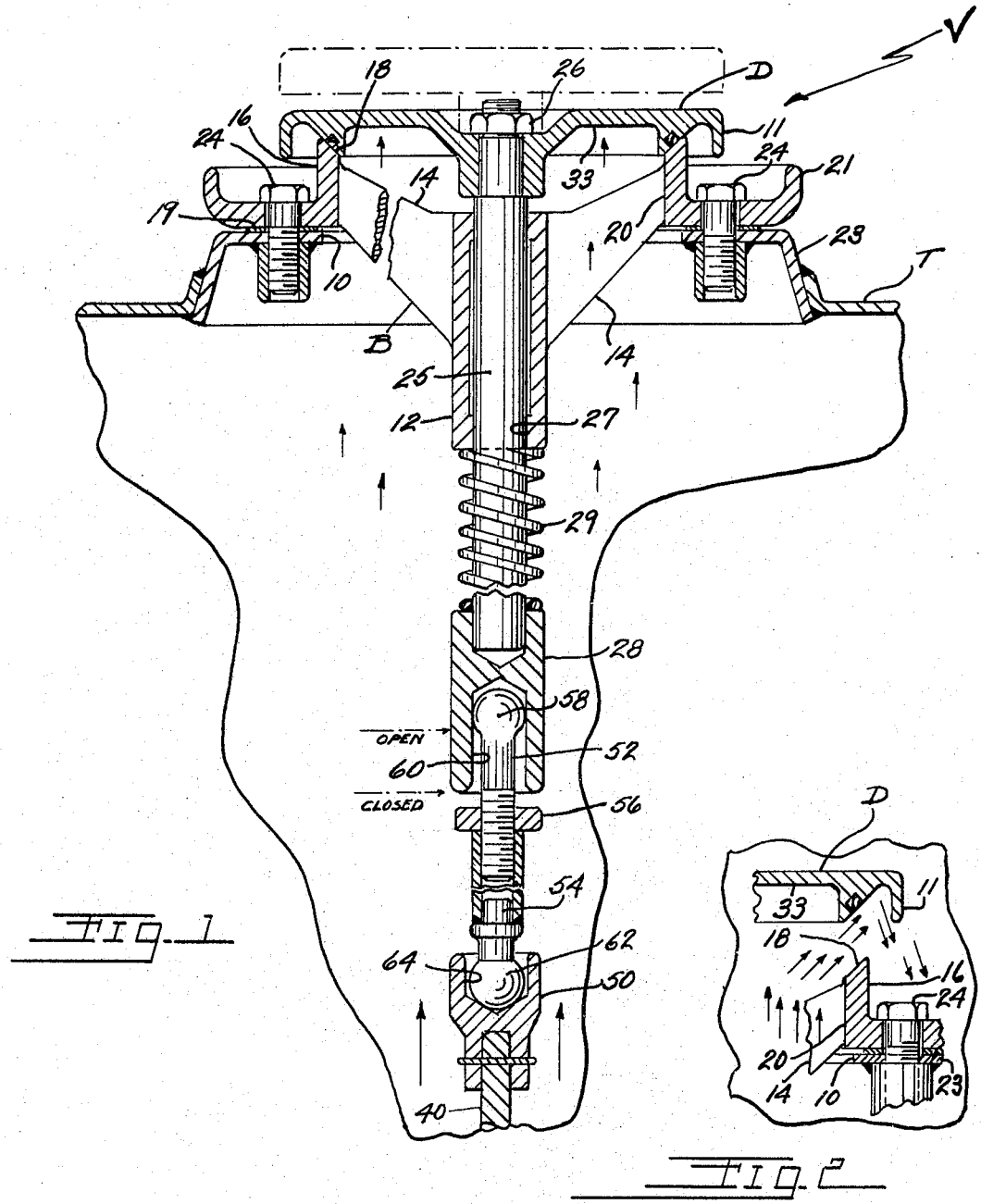

INVENTOR.
JOSEPH H. DE FREES
BY
Baldwin, Doran & Egan
ATTORNEYS

United States Patent Office 3,486,528
Patented Dec. 30, 1969

3,486,528
VENT VALVE HAVING DYNAMIC VALVE OPENING STRUCTURE
Joseph H. De Frees, 414 Liberty St., Warren, Pa. 16365
Filed Feb. 6, 1967, Ser. No. 614,242
Int. Cl. F16k 45/02, 31/12
U.S. Cl. 137—587
8 Claims

ABSTRACT OF THE DISCLOSURE

A pressure relief vent valve for the vent opening in a fluid storage or transportation tank and including a valve disc disposed exteriorly of the tank and reciprocable to and from the opening to seal the same. A bias means is provided for retaining the disc in a normally-closed position against the opening. The disc is configured to vent pressurized gases interiorly of the tank in a reversed curved path whereby the kinetic energy of the exiting gases retains the disc in a wider open position thereby providing greater volumetric flow of such exiting gases at no increase in internal pressure.

---

This invention relates to valves, and more particularly to relief or vent valves on tanks used for the storage or transportation of fluids.

There has long been a need for a simple, more efficient and highly effective tank relief valve for venting pressurized fluids interiorly of the tank to the atmosphere.

Prior vent valves require a high steady pressure to remain open and usually create turbulence in the exiting gases. Lower valve actuation venting pressures were effective only if the size of the huddling area was substantially increased thereby necessitating an increase in the overall size of the valve, which is highly undesirable. Thus, an increase in venting capacity was achieved only by increasing the size of the valve. A further problem is the provision of automatic in-breathing during tank discharge in conjunction with out-breathing during tank filling, in addition to permitting fluid discharge when tank internal pressure exceeds a predetermined maximum because of fire exposure or accident.

Therefore, it is an object of the present invention to provide a vent valve having substantially increased venting capacity at the same or less pressure and with no increase in valve size.

A further object of the invention is to provide a vent valve which remains open with less venting pressure and with no increase in huddling area or valve size.

A further object of the invention is to provide a vent valve having increased poppet travel without additional venting pressure, thus providing greater vent flow, without turbulence, at the same or less pressure and without any increase in valve size.

A further object of the invention is to provide a vent valve effecting a greater differential between opening and closing pressures.

A further object of the invention is to provide a tank vent valve constructed in coaction with the tank loading and discharge valve wherein in-breathing during product discharge, out-breathing during filling, and emergency venting in case of fire exposure or accident is provided.

A further object of the invention is to provide a vent valve of the above type permitting product discharge through the vent valve in case of an over-fill or accident.

A further object of the invention is to provide a vent valve which diverts the flow of the venting gases away from the tank.

A further object of the invention is to provide a tank vent valve of the above type that is simple in construction, inexpensive to manufacture, and highly effective in operation.

Briefly, the foregoing objects are accomplished by the provision of a tank vent valve having its venting valve disc (biased to normally closed position) configurated to provide a reversed curved path for the exiting gases such that the kinetic energy of such reversed flow exiting gases assists in retaining the disc in open position thereby requiring less pressure for venting the tank. To divert the flow of the venting gases away from the tank, an annular diverter flange disposed outwardly of the valve disc may be provided.

As an additional feature of the invention, the valve disc may be connected to the operating handle of the tank loading and discharge valve disposed at the bottom of the tank, whereby actuation of such loading and discharge valve opens the vent valve. With this construction, automatic out-breathing and in-breathing is provided whenever the tank is loaded or discharged, respectively.

With the above construction, substantially greater volumes of gases can be vented at no increase (or even less) pressure and with no increase in valve size.

Other objects and advantages of the invention will be apparent from the following description taken in conjunction with the drawings wherein;

FIGURE 1 is a front elevational sectional view of a tank vent valve constructed in accordance with the invention and showing, in dot-dash lines, the valve disc in open position;

FIGURE 2 is a protional sectional view of the right end of the valve disc and coacting valve seat shown in FIGURE 1, but showing the disc in open position;

Figure 3:
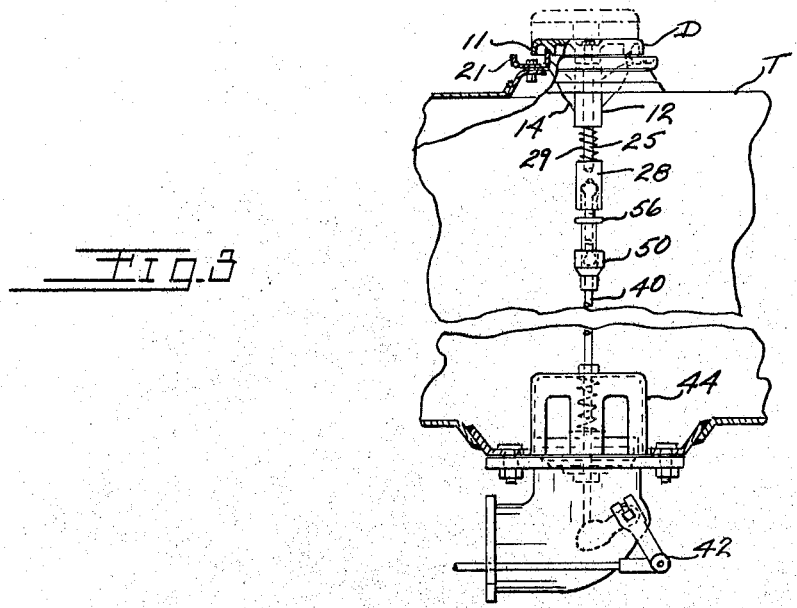
Figure 4:
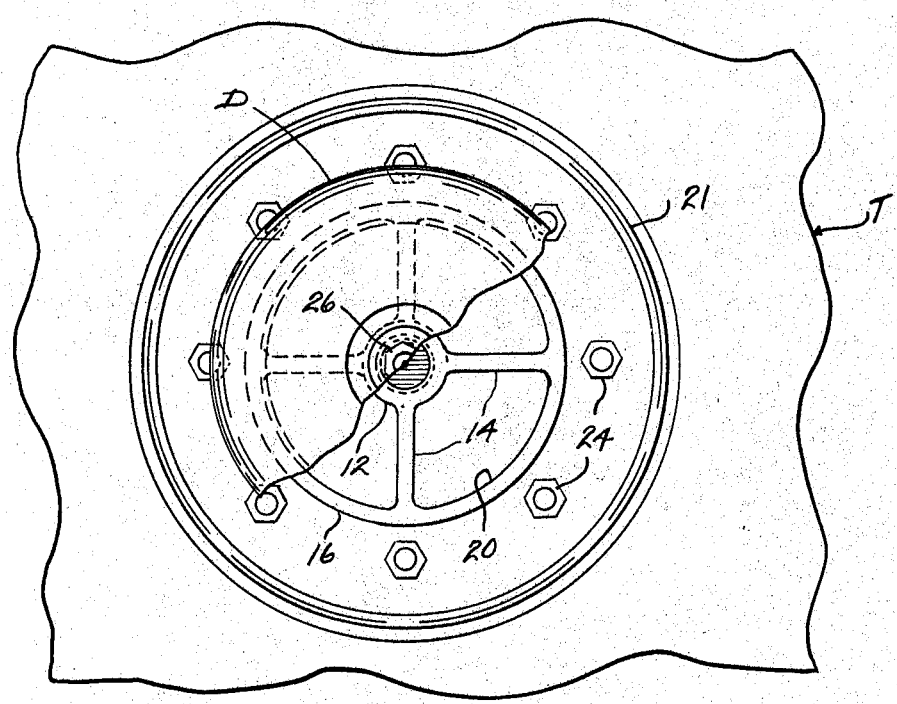

FIGURE 3 is a front elevational view, partly in section, showing an application of the vent valve of the invention, wherein the valve disc is connected to the operating handle of a tank loading and discharge valve, and showing in dot-dash lines the vent valve disc in open position; and FIGURE 4 is a top view of the vent valve shown in FIGURE 1, but with a portion of the disc removed to illustrate the valve interior.

Although the invention is shown and described herein with reference to its application to fluid storage tanks, it will be understood that it may be applied on any type of fluid container for venting pressurized fluids therefrom.

Referring first to FIGURES 1 and 4, there is shown a tank fluid pressure relief or vent valve of the invention, generally designated as V, disposed in the vent opening or aperture 10 of a fluid storage tank T. The valve V includes, as main components, a poppet or disc D disposed exteriorly of the tank, and a body or base B. The outer edge portion of the disc D is formed into a downwardly or inwardly directed annular peripheral flange or deflector 11.

The base B comprises a centralized elongated sleeve or stem guide 12 having a plurality of arms 14 extending outwardly from the stem guide and secured at their outer ends to an annular ring 16 having a valve seat 18 on the upper edge thereof, said ring 16 defining the vent aperture or opening 20. The opening 20 is disposed outwardly or exteriorly of the opening 10 and is in series therewith. The outer portion of the ring 20 is formed into a vent diverter flange 21 disposed outwardly of the disc deflector 11, the purpose of which will be hereinafter described. Thus, the arms 14 are connected to the ring 16 and the flange 21 which are integrally formed. The base B is detachably secured to the annular tank flange 23 by the bolts 24, said flange 23 being welded to the tank T and forms a part thereof. A tight joint between the base B and the flange 23 is effected by the use of the gasket 19.

The disc D is detachably secured (at its central portion) to an elongated centralized stem 25 by means of the nut 26, said stem being telescoped or slidably disposed in the longitudinal bore 27 of the stem guide 12 for vertical reciprocation therein, thereby enabling the disc D to reciprocate to and from the seat 18 and selectively seat itself against such seat to seal the same and thus control the flow of fluids past the vent opening 20. Secured to the bottom end of the stem 25 is an adaptor 28. A suitable bias means such as the compressed coil spring 29 encircles the stem 25 and is interposed and acts between the guide 12 (of the base) and the adaptor 28 to retain the disc D against the seat 18 in a normally-closed position.

In one mode of operation, pressurized fluid interiorly of the tank T acting on the underside of the disc D causes it to move upwardly (against the action of the compressed spring 29) off the valve seat 18 thereby permitting such pressurized fluid to vent to the atmosphere exteriorly of the tank in the direction of the arrows shown in FIGURE 2. It will be noted that the deflector 11 causes the venting gases to flow in a substantially reversed curved path. With this construction, the kinetic energy of such exiting pressurized fluid assists in retaining the disc D in raised or open position against the action of the bias means or spirng 29. This structure permits substantially larger volumes of fluid to be vented in a smooth streaming flow (with little friction and no turbulence) at less exiting or venting pressure and with no increase in valve size. More specifically, the size of the huddling area 33 on the underside of the disc D remains unchanged, yet the valve venting capacity is substantially increased (over 2¼ times that of prior structures). Also, such kinetic energy of the exiting fluids effects increased disc or poppet travel without additional venting pressure. A further desirable result is that there is a greater differential between opening and closing pressures in addition to greater valve sensitivity. In effect, the invention provides the equivalent of a substantially increased huddling area without any actual increase in huddling area size. Thus, not only may such vent valves be reduced in size, but the number of such valves required per tank may be substantially reduced.

The stem 25 is adjustably secured to a lower stem or stem extension 40 (FIGURE 3) which, in turn, is operatively connected to the operating handle 42 of the tank loading and discharge valve 44 disposed at the bottom of the tank T. With this construction, the vent valve V is in open position whenever the tank loading and discharge valve 44 is open, thereby providing out-breathing during tank product filling and in-breathing during tank product discharge. The loading and discharge valve 44 is conventional and will not be described further in detail as the same, per se, forms no part of the invention.

To provide for misalignment and for selective independent action of the disc D, the stems 25 and 40 are connected by an extensible ball-sleeve joint comprising the adapters 28 and 50 (FIGURE 1), and the coacting connecting push rods 52 and 54 which are adjustably connected together by the adjusting nut 56. The upper end of the rod 52 is formed into a ball 58 which is slidably disposed in the elongated internal open-ended bore 60 of the adapter 28. Likewise, the lower end of the rod 54 is formed into a ball 62 rotatively disposed in the internal open-ended bore 64 of the adapter 50. With this structure, the disc D is permitted to raise to open position independently of its connection to the operating handle 42 should tank internal pressure exceed a predetermined maximum as may happen in the case of fire, overflow, or overturning of the tank through accident.

In some instances, it may be essential to divert the flow of venting gases away from the tank. This may be effected by the annular peripheral diverter flange 21 disposed on the tank exterior outwardly of and in spaced relation to the deflector flange 11 and extending in a direction opposite to that of the deflector flange. The diverter flange 21 directs the exiting gases away from the tank after they are received from the deflector 11. Thus, the vented or exiting pressurized fluid flows first in said reversed curved path around the deflector flange 11 and thence outwardly away from the tank T around the diverter flange 21.

In function, prior safety valves are either open or closed, with the open position thereof constituting a holding action. With the present valve V, valve actuation is not to be construed as a holding action or as being either open or closed, but is to be construed as open or more open. More specifically, the kinetic energy of the exiting gases plays a predominant role in causing the disc D to be placed in a much greater open position than in prior structures. The disc D functions not only to open the valve, but opens substantially further than in prior structures and holds it there. In other words, the disc D effects increased travel, which, in turn, effects substantially increased flow capacity of the exiting gases. The valve V, in practice, is most sensitive in operation, and provides for a high-capacity pressure-actuated device which automatically opens when pressure in the tank rises above a predetermined pressure such as, for example, three p.s.i., due to fire or other causes.

Additionally, the invention provides for inbreathing and outbreathing when the emergency valve 44 is open. In other words, the valve V becomes a manually operated valve.

It will be understood that the disc D achieves a substantially increased open position not only from the reversing of the exiting gases around the flange 11, but also because such reversed exiting gases strike a surface, including the nuts 24 and the adjacent area therearound, immediately after such gases pass by the flange 11.

What is claimed is:

1. A fluid pressure relief valve for the vent opening in a fluid storage tank including, a valve disc disposed exteriorly of the tank and reciprocable to and from said opening to selectively seal the same, and bias means for retaining said valve disc in a normally closed position against said opening, said valve disc being configured to vent pressurized fluid exiting from the tank in a smooth reversed continuously-bending arched curved path whereby the kinetic energy of the exiting fluid assists in retaining the disc well off of the opening against the action of the bias means, the undersurface of said valve disc having an annular recess the outer wall of which is vertically disposed, the inner wall thereof being inclined inwardly and downwardly from the top of the outer wall.

2. The structure of claim 1 and further including a vent diverter flange disposed on the tank exterior outwardly of and in spaced relation to the outer wall of the recess in said valve disc and extending in a direction opposite to that of said outer wall whereby the exiting pressurized fluid flows in said reversed curved path around said outer wall and thence outwardly away from the tank around the diverter flange.

3. A fluid pressure relief valve for a fluid storage tank having a vent aperture comprising, a valve base disposed in said aperture and having a vent opening exteriorly of the aperture and in series therewith, a valve disc disposed exteriorly of the tank and slidably positioned in said base for selectively sealing said opening, and bias means acting between the base and disc for retaining the disc in a normally-closed position against said opening, said disc being configured to vent pressurized fluid exiting from the tank in a smooth reversed continuously-bending arched curved path whereby the kinetic energy of the exiting fluid assists in retaining the disc well off of the opening against the action of the bias means, the under surface of said valve disc having an annular recess the outer wall of which is vertically disposed, the inner wall thereof being inclined inwardly and downwardly from the top of the outer wall.

4. The structure of claim 3 wherein said base includes a centralized stem guide extending into the tank and a plurality of radial arms extending outwardly from the guide and connected to the vent diverter flange at the outer ends thereof, the inner portion of said diverter flange being formed into an outwardly extending annular ring having a valve seat at its outer edge for receiving the disc in sealing relation therewith, said guide having a longitudinal bore, said disc including a centralized stem reciprocably telescoped into said bore thereby enabling the disc to reciprocate to and from said seat to selectively seal said opening.

5. The structure of claim 4 wherein said stem includes a stem extension extending through the tank, and said fluid pressure relief valve further includes a tank loading and discharge valve disposed at the bottom of the tank and having an operating handle, said stem extension being connected to said operating handle whereby actuation of the loading and discharge valve opens the relief valve.

6. The structure of claim 5 wherein said stem is connected to said stem extension with an extensible ball-sleeve joint to compensate for misalignment between the valves and to permit the relief valve to open independently of its connection to the loading and discharge valve.

7. The structure of claim 6 wherein said bias means is a coiled spring encircling said stem and compressed between said guide and said ball-sleeve joint.

8. The structure of claim 3 wherein the outer edge portion of said disc is formed into an inwardly turned peripheral deflector flange to form said reversed curved path for the exiting pressurized fluid, and further including a vent diverter flange disposed on the tank exterior outwardly of and in spaced relation to said deflector flange and extending in a direction opposite to that of the deflector flange whereby the exiting pressurized fluid flows in said reversed curved path around the deflector flange and thence outwardly away from the tank around the diverter flange, said base including a centralized stem guide extending into the tank and a plurality of radial arms extending outwardly from the guide and connected to the vent diverter flange at the outer ends thereof, the inner portion of said diverter flange being formed into an outwardly extending annular ring having a valve seat at its outer edge for receiving the disc in selective sealing relation therewith, said guide having a longitudinal bore, said disc including a centralized stem reciprocably telescoped into said bore thereby enabling the disc to reciprocate to and from said seat to selectively seal said opening, said stem including a stem extension extending through the tank and connected to the operating handle of an associated tank loading and discharge valve at the bottom of the tank whereby actuation of the discharge valve opens the relief valve, said stem being connected to said stem extension with an extensible ball-sleeve joint to compensate for misalignment between the valves and to permit the relief valve to open independently of its connection to the loading and discharge valve, said bias means being a coiled spring encircling said stem and compressed between said guide and said ball-sleeve joint.

References Cited

UNITED STATES PATENTS

| | | | |
|---|---|---|---|
| 2,638,924 | 5/1953 | St. Clair | 251—14 |
| 3,125,320 | 3/1964 | De Frees | 137—587 XR |

WALTER A. SCHEEL, Primary Examiner

R. I. SMITH, Assistant Examiner

U.S. Cl. X.R.

251—14